United States Patent [19]
Nachtergaele et al.

[11] Patent Number: 5,978,509
[45] Date of Patent: Nov. 2, 1999

[54] LOW POWER VIDEO DECODER SYSTEM WITH BLOCK-BASED MOTION COMPENSATION

[75] Inventors: Lode J.M. Nachtergaele, Leuven; Francky Catthoor, Temse, both of Belgium; Bhanu Kapoor, Irving, Tex.; Stefan Janssens, Lennik, Belgium

[73] Assignees: Texas Instruments Incorporated, Dallas, Tex.; Inter-University Microelectronics Center (IMEC), Leuven, Belgium

[21] Appl. No.: 08/955,886

[22] Filed: Oct. 22, 1997

Related U.S. Application Data

[60] Provisional application No. 60/028,606, Oct. 23, 1996.

[51] Int. Cl.$^6$ ....................................................... G06K 9/36
[52] U.S. Cl. .......................... 382/236; 382/232; 382/238; 348/413; 348/416
[58] Field of Search .................................... 382/236, 232, 382/238; 348/413, 416

[56] References Cited

PUBLICATIONS

"An Overview of the H.261 Video Compression Standard and its Implementation in the GPS Chipset" (GEC Plessey Semiconductors, 1995).
"Video Codec DSP MN195902" (Matshushita Electronics Corporation, 1996).
Azim, et al., "A Low Cost Application Specific Video Codec for Consumer Video Phone", *Custom Integrated Circuits Conference,* Paper 6.7.1 (IEEE, 1994), pp. 115–118.
Lee, et al., "Data Flow Processor for Multi–standard Video Codec", Paper 6.4.1, pp. 103–106, (unknown date).
"Advance Information: VP2615 H.261 Decoder" (GEC Plessey Semiconductors), (unknown date).
Wuytack, et al., "Global communication and memory optimizing tranformations for low power systems", *Int. Workshop on Low Power Design,* (IEEE, 1994), pp. 203–208.
Seethamaran, "H.261. & H.263 Decoders on DSP56301", ICSPAT (1997) pp. 963–967.
Chang, et al., "Design and Implementation of a Software–only H.261 Video Codec", ICSPAT (1997), pp. 973–977.
"NetMeeting 2.0 features" (Microsoft Corporation, Sep. 30, 1977).

(List continued on next page.)

*Primary Examiner*—Jose L. Couso
*Assistant Examiner*—Anh Hong Do
*Attorney, Agent, or Firm*—Robert D. Marshall, Jr.; Gerald E. Laws; Richard L. Donaldson

[57] ABSTRACT

A battery-powered computing system (20) including video decoding capability, particularly as pertinent to the H.263 standard, is disclosed. The system (20) includes a main integrated circuit (30) having an on-chip central processing unit (CPU) (32) and on-chip shared memory (33) for the temporary buffering of video image data that is retrieved and generated during the video decoding process. The CPU (32) is programmed to perform a combined P and B prediction process (46) upon a previously predicted P frame ($P_{T-1}$), with accesses to internal buffers in shared memory (33) instead of to main memory (40). Preferably, inverse transform processes (48, 52) also access shared memory (33) rather than main memory (40). The combined P and B prediction process (46) preferably handles unrestricted motion vectors using edge pixels ($P_{edge}$) stored in an edge buffer (44e) in the on-chip memory (33), by modifying (58, 60) motion vector components (MVx, MVy) that point outside of the displayable video image, and retrieving the corresponding edge pixels ($P_{edge}$) from the edge buffer (44e) in this event. The on-chip memory (33) preferably also includes a buffer (NEWBFR) for storing current predicted P blocks, such that the previous predicted P frame ($P_{T-1}$) and the current predicted P frame ($P_T$) can share the same memory space (old/newframe). The power requirements of the video decoding process are thus much reduced, as memory accesses to large, off-chip, main memory (40) are limited.

36 Claims, 8 Drawing Sheets

OTHER PUBLICATIONS

Williams, "Microsoft NetMeeting: Complete Internet Conferencing" (Win95, 1997).

Diguet, et al., "Formalized methodology for data reuse exploration in hierarchical memory mappings" (ACM, 1997), pp. 30–33.

Ueda et al., "Development of an MPEG2 decoder for magneto–optical disk video players", *Transactions on Consumer Electronics*, vol. 41, No. 3 (IEEE, 1995), pp. 521–527.

"Line Transmission of Non–Telephone Signals: Video Coding for Low Bitrate Communication", draft specification H.263 (International Telecommunication Union, Nov. 1995), available at http://www.nta.no/brukere/DVC/h263–wht/h263wht.html.

"Mpact Mediaware for Videophone" (Chromatic Research Inc., 1997).

Schaumont, et al., "Synthesis of Pipeline DSP Accelerators with Dynamic Scheduling", *Proc. Int. Workshop on VLSI Signal Processing*, (IEEE, 1996), pp. 115–124.

Chandrakasan, et al., "Minimizing Power Consumption in Digital CMOS Circuits", *Proceedings of the IEEE*, vol. 83, No. 4 (IEEE, 1995), pp. 498–523.

Toyokura, et al., "A Video DSP with a Macroblock–Level–Pipeline and a SIMD Type Vector–Pipeline Architecture for MPEG2 CODEC", *Journal of Solid State Circuits*, vol. 29, No. 12 (IEEE, 1994), pp. 1474–1480.

Genin, et al., "DSP Specification Using the SILAGE Languagae", *Proc. Int. Conf. on Acoustics, Speech, and Signal Processing*, (IEEE, 1990), pp. 1057–1060.

Itoh, et al., "Trends in Low–Power RAM Circuit Technologies", *Proceedings of the IEEE*, vol. 83, No. 4 (IEEE, 1995), pp. 524–543.

Masaki, et al., "VLSI Implementation of Inverse Discrete Cosine Transformer and Motion Compensator for MPEHG2 HDTV Video Decoding", *Trans. on Circuits and Systems for Video Technology*, vol. 5, No. 5 (IEEE, 1995), pp. 387–395.

Demura, et al., "A single–chip MPEG2 video decoder LSI", *Proc. IEEE Int. Solid State Circuits Conf.* (IEEE, Feb. 1994), pp. 72–73.

Galbi, et al., "An MPEG–1 audio/video decoder with run–length compressed anti–aliased video overlays", *Proc. IEEE Int. Solid State Circuits Conf* (IEEE, Feb. 1995), pp. 287–289.

Harrand, et al., "A Single–Chip Videophone Video Encoder/Decoder", *Proc. IEEE Int. Solid State Circuits Conf.* (IEEE, Feb. 1995), pp. 292–293.

Catthoor, et al., "Global communication and memory optimising transformations for low power signal processing systems", *IEEE Workshop on VLSI Signal Processing* (1994), pp. 178–187.

Chen, et al., "A fast computational algroighm for the discrete cosine transform", *Transactions on Communications*, (IEEE, Sep. 1977), pp. 1004–1009.

Cugnini, et al., "MPEG–2 Video Decoder for the Digital HDTV Grand Alliance System", *Transactions on Consumer Electronics*, vol. 41, No. 3 (IEEE, 1995), pp. 748–753.

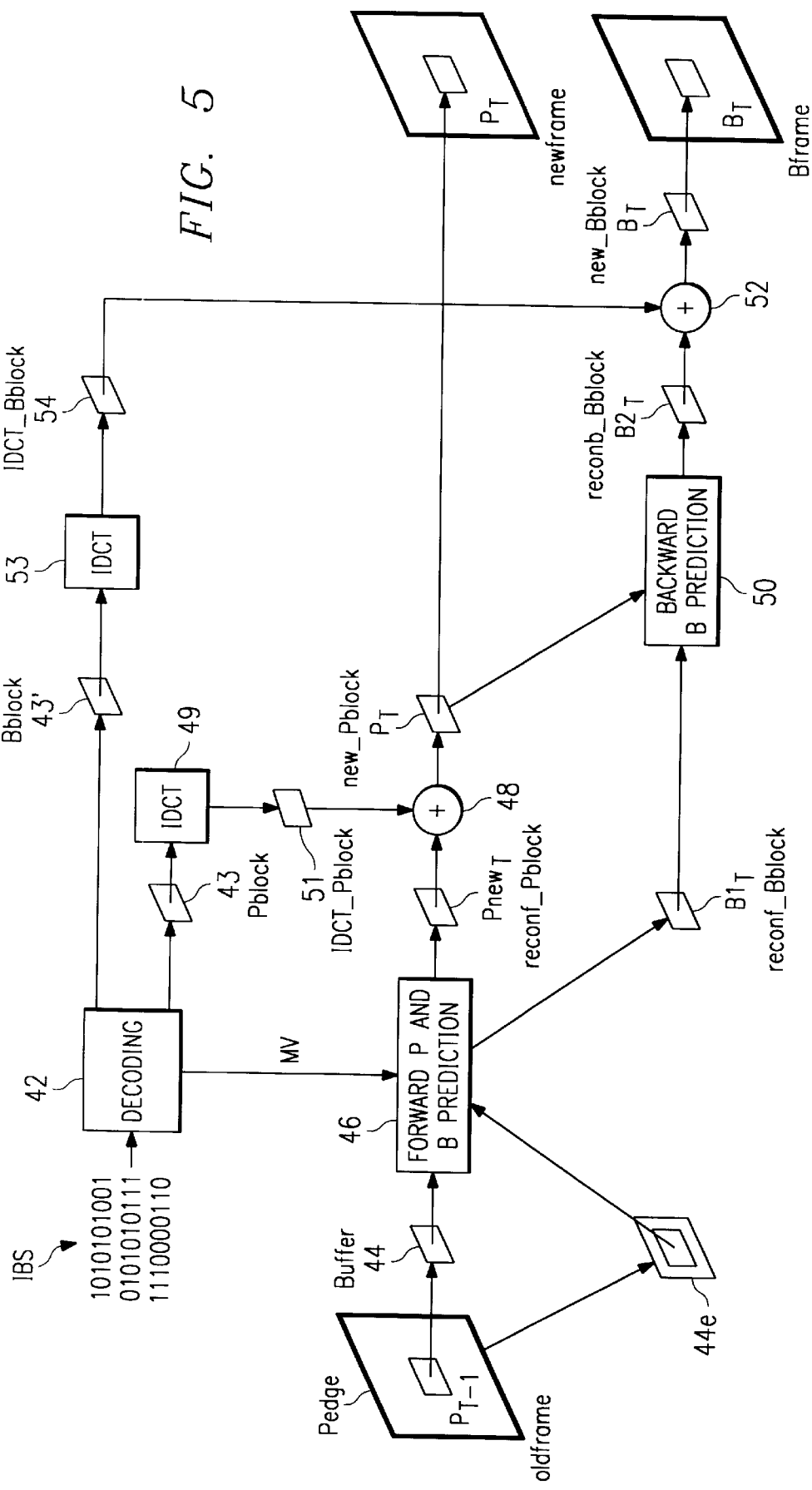

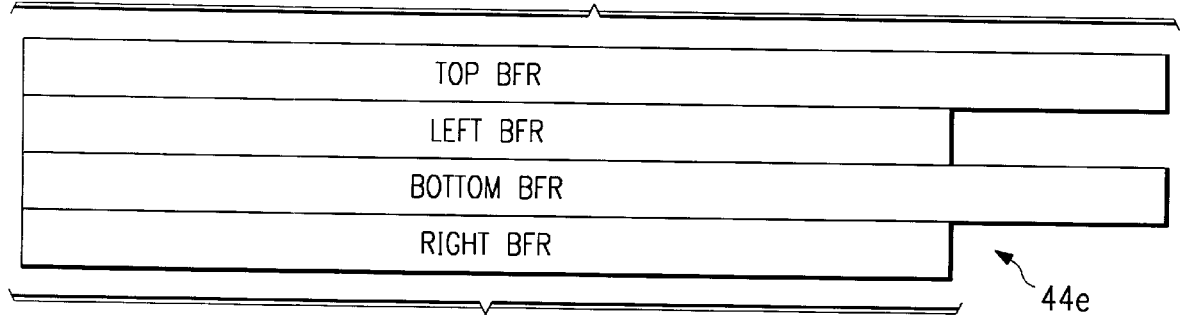
FIG. 8d
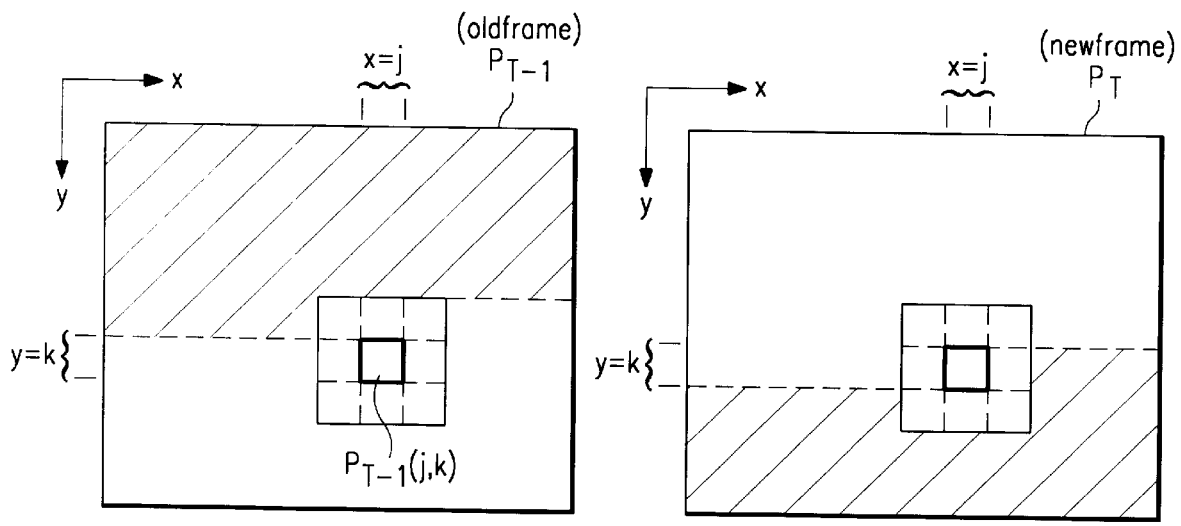
FIG. 9a
FIG. 9b
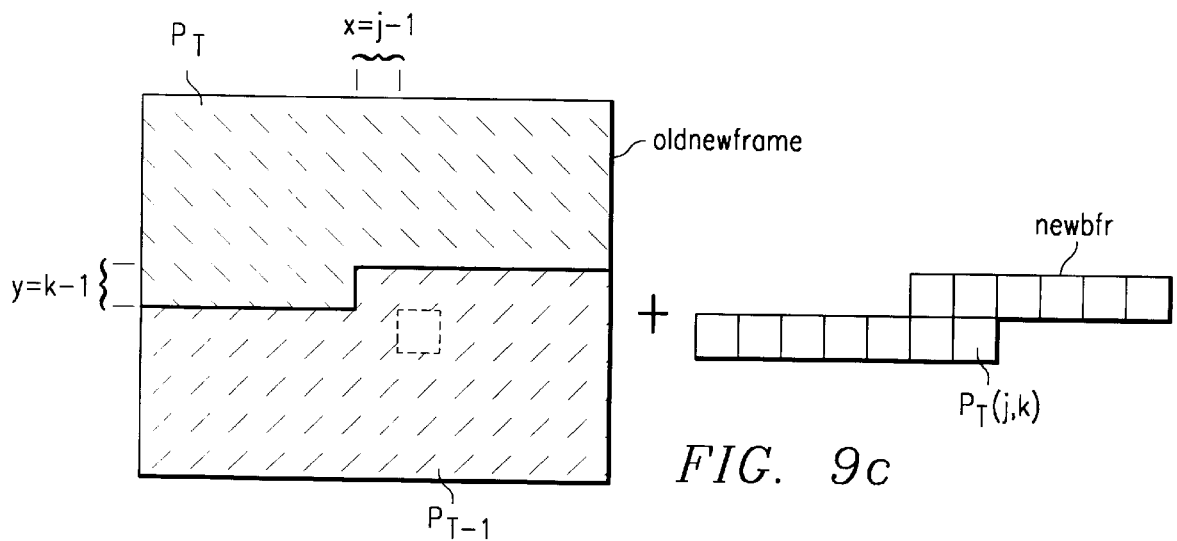
FIG. 9c

LOW POWER VIDEO DECODER SYSTEM WITH BLOCK-BASED MOTION COMPENSATION

CROSS-REFERENCE TO RELATED APPLICATIONS

This application claims the benefit, under 35 U.S.C. §119(e)(1), of U.S. Provisional Application No. 60/028,606, filed Oct. 23,1996, which is incorporated herein by this reference.

BACKGROUND OF THE INVENTION

This invention is in the field of telecommunications, and is more specifically directed to the decoding of video signals communicated over relatively low bit-rate communications lines.

As is evident in the art, the extent and rate of telecommunication of information around the world, particularly by way of the Internet, has greatly increased in recent years. In particular, the high bit rates at which modern communications systems operate have permitted the communication of a wide range of information, from simple text, to audio signals, to graphics images, and up to and including motion picture video information. Data compression techniques, in combination with the improvement in available bit rate, have also enabled such communication, particularly of video information. As a result, end users have become accustomed to receiving information of all of these types, at data rates and display quality that approaches "real-time" viewing of the information, particularly at workstations that are connected to high-speed digital communications networks. This ability to display such information, particularly motion picture video information, in real time has resulted, of course, in a substantial increase in the production and distribution of such video information, as motion picture video is often a preferred medium for communication of information.

However, high-speed telecommunication facilities are not available in all locations, or in all applications. For example, most home computer systems effect telecommunication over analog telephone lines, using modems of bit rates up to on the order of 28.8 and 56.6 kbps. The use of mobile computing devices, such as notebook computers, to effect telecommunications is also increasing at a dramatic rate, with the telecommunication of information being carried over cellular and wireless links. In response to this demand, video compression approaches have been developed to serve the need of communication of motion picture information over low bit-rate (less than 64 kbps) facilities. Well-known examples of these video compression techniques include the H.261 and H.263 video compression standards, developed in conjunction with the International Telecommunications Union (ITU) and based upon the well-known MPEG standards developed by the Moving Pictures Experts Group. These approaches have enjoyed popularity in the communication of compressed video information over these low bit-rate facilities. Additionally, compression according to an H.263-like algorithm is included within the currently-proposed MPEG4 standard.

The receipt of compressed video information, including information compressed according to the H.263 video compression standard, requires the receiving workstation or computer to perform video decoding of the communicated information, in order to effect display of the motion picture. Such video decoding operations conventionally include the execution of data processing instructions, including memory read and write accesses, by the receiving computer.

Referring now to FIGS. 1 and 2, the operation of a conventional video decoding system in receiving and decoding compressed video information, according to the H.263 standard, will now be described by way of further background. As is fundamental in the art, H.263 video decoding predicts motion from frame to frame in a video sequence by way of motion vectors, which are two-dimensional vectors that provide offsets from the coordinate position from a prior, reference, frame to coordinates in the frame currently being decoded. The redundant, or non-moving, information from frame-to-frame is encoded by way of a transform, for example a discrete cosine transform (DCT), the inverse of which is performed by the video decoding system. The inverse transform of the redundant portion of the transmitted frame, in combination with the results of the motion vectors, produce a displayable frame.

FIG. 1 illustrates the general nomenclature and temporal sequence utilized in the generation of predicted frames in H.263 video decoding. According to the H.263 standard, the incoming bitstream of video data corresponds to displayable video frames which are predicted over time, using the currently decoded frame and the previously decoded frame in the sequence. As illustrated in FIG. 1, frame $P_{T-1}$ is a previously predicted frame corresponding to the immediately preceding frame in the video sequence to that currently being decoded, and is referred to as a "P" frame, as it is predicted from its prior neighbor frame. Past P-frame $P_{T-1}$ is then used to predict a future (or current) P frame $P_T$; as will be described hereinbelow and as known by those in the art familiar with the H.263 standard, the forward-prediction of frame $P_T$ is based upon past P frame $P_{T-1}$ and upon motion vectors derived from the frame currently being decoded. According to the H.263 standard, a forward prediction from the past P-frame $P_{T-1}$ and a backward prediction from the future P-frame $P_T$ are used to predict a current B frame $B_T$ (the "B" indicating that frame $B_T$ is bidirectionally predicted). The combination of the decoded P frame $P_T$ and B frame $B_T$ is referred to as the "PB" frame in the H.263 standard, and serves as the basis of the displayed frame. The H.263 standard is thus particularly well-suited for low bit rate telecommunication channels, as its coding scheme is intended to take advantage of temporal and spatial redundancy.

A conventional algorithm for performing the generation of the decoded P frame $P_T$ and B frame $B_T$ is illustrated by way of the pictorial representation of FIG. 2. This implementation corresponds to a C language computer program (Version 1.3) available from Telenor at http://www.nta.no/brukere/DVC/h263_software/ (February, 1995), and includes the extensions of allowing motion vectors to point outside of the frame (i.e., unrestricted motion vectors) and of using extra motion vectors to compensate for motion according to the overlapped block motion compensation (OBMC) approach. In this exemplary implementation, input bitstream IBS includes a stream of data which is initially decoded in process 2 to generate motion vectors MV, and uncompensated decoded macroblocks 3, 3'. Decoded macroblock 3 corresponds to a P block of information from input bitstream IBS, while decoded macroblock 3' corresponds to a B block of information from input bitstream IBS. Elements MV, 3, 3' of the input bitstream are to be used, in combination with previous P-frame $P_{T-1}$, in the prediction of the decoded frames $P_T$ and B frame $B_T$. As is known in the art, each frame (P-frame or B-frame) includes multiple macroblocks, typically arranged in the QCIF format as nine rows of eleven macroblocks; each macroblock in the H.263 standard corresponds to six blocks of DCT coefficients derived from an eight-by-eight array of pixels; these six blocks generally include four blocks of luminance (Y) data and two blocks of chrominance (Cr, Cb) data.

FIG. 2 illustrates that the previous P-frame $P_{T-1}$ is stored in memory as array signal oldframe. In process 8, the video decoding system adds a border of image blocks (e.g., forty-four macroblocks) around the perimeter of previous P-frame $P_{T-1}$; these border image blocks permit so-called "unrestricted" motion vectors, in that the motion vectors may extend to outside of the viewed image area, resulting in a decompressed image that is less susceptible to visible edge effects. The resulting bordered P-frame $Pext_{T-1}$ is stored in memory as array signal edgeframe, as illustrated in FIG. 2.

As illustrated in FIG. 2, each macroblock of bordered P-frame $Pext_{T-1}$ is applied to forward P prediction process 9 which, in combination with motion vectors MV from decoding process 2 generates intermediate P frame $Pnew_T$, which is stored in memory as array signal newframe. FIG. 3 illustrates, by way of a flow diagram, the operation of conventional forward P prediction process 9, in the case where OBMC motion compensation is enabled. As illustrated in FIG. 3, forward prediction process 9 begins with the retrieval, in process 9a, of bordered prior frame $Pext_{T-1}$, including its luminance (Y) and chrominance (Cr, Cb) information. An OBMC index i is initialized to zero in process 9b, and four passes of motion compensation upon the luminance data in the prior frame $Pext_{T-1}$ is then performed. In conventional video decoder systems, the OBMC motion compensation is performed by calling and applying a function to the luminance data of prior predicted frame $Pext_{T-1}$, using motion vectors MV, for the index i, as indicated by process 9c in FIG. 3. Processes 9d, 9e increment and test the index i as shown, to determine the completion of the luminance OBMC compensation routine. For OBMC compensation of luminance data, processes 9b through 9e are generally performed on a macroblock basis, with each of the four luminance blocks processed one at a time through the loop of processes 9c and 9d. Following decision 9e determining that the loop of processes 9c, 9d is complete (decision 9e being YES), process 9f then performs motion compensation upon the upon the chrominance Cr information in the bordered prior frame $Pext_{T-1}$, using motion vectors MV, and process 9g similarly performs motion compensation upon the chrominance Cb information. The resulting predicted frame $Pnew_T$ is then stored as array signal newframe.

As is known in the art, motion compensation modes other than OBMC are utilized in H.263 video compression and decompression. These alternative modes are similar to, but simpler than, the OBMC mode described above; conventional algorithms for these simpler motion compensation modes are known in the art.

In conjunction with forward P prediction process 9, each decoded P macroblock 3 is applied to inverse discrete cosine transform (IDCT) process 4, producing a transform P block 5 corresponding to the redundant spatial domain frame-to-frame information; this transform P block 5 is summed with corresponding macroblocks of predicted intermediate frame $Pnew_T$ in process 10 to produce future predicted frame $P_T$. Frame $P_T$ replaces predicted intermediate P frame $Pnew_T$ in memory as array signal newframe, as shown in FIG. 2.

Bordered past predicted frame $Pext_{T-1}$ is also applied to forward B prediction process 12 to generate first intermediate B frame $B1_T$, which is stored in memory as array signal Bframe. FIG. 3 also illustrates the details of forward B prediction process 12 which is performed after forward P prediction process 9 described hereinabove. As is known in the art, the four-vector OBMC compensation process is not applied in the generation of B frames. Process 12 begins with the retrieval, in process 12a, of the prior predicted and bordered P frame $Pext_{T-1}$, including the luminance and chrominance information. Processes 12b, 12c, 12d apply motion compensation to the luminance, chrominance Cr, and chrominance Cb information from bordered P frame $Pext_{T-1}$, using the motion vectors MV from decoding process 2, typically in a macroblock-by-macroblock manner. The resultant B frame $B1_T$ is then stored in memory as array signal Bframe, in process 12e.

Backward B prediction process 14 retrieves frame $B1_T$ from array signal Bframe in memory and future predicted frame $P_T$ from array signal newframe in memory, and combines these retrieved frames $B1_T$, $P_T$ to produce second intermediate B frame $B2_T$, which replaces first intermediate B frame $B1_T$ in memory as array signal Bframe. Decoded B macroblocks 3' are sequentially applied to IDCT process 4' to produce transform B macroblocks 5' which is added to corresponding macroblocks of second intermediate B frame $B2_T$ in summing process 16, the result of which is current B frame $B_T$. Frame $B_T$ is stored in memory as array signal Bframe, replacing second intermediate B frame $B2_T$, as shown in FIG. 2.

As noted above, the PB frame corresponding to the combination of predicted frames $P_T$ and $B_T$ are used to derive the displayed frame, decoded from input bitstream IBS. Decoding of the next received frame is then performed in similar manner, with the current P frame $P_T$ becoming previous P frame $P_{T-1}$ for the next decoding operation; this swap is conventionally performed simply by swapping the pointers for array signals newframe and oldframe, as frame $P_{T-1}$ from the generation of P frame $P_T$ is no longer needed.

It has been observed, however, that the large quantity and high rate of information received in connection with compressed video, and the processing requirements for decoding the information, can result in substantial power dissipation by the receiving computer. Power dissipation is especially of concern in mobile computers, such as notebook computers, which are powered by batteries. In particular, the heavy rate at which complex data types are accessed from main memory resources (typically off-chip memory), in decoding and displaying compressed video information, has been observed to be a significant drain of battery power, thus reducing the usability of such mobile computers in receiving and displaying decoded video information.

In particular, it has been observed that conventional video decoding algorithms have been written with ease of program control being of paramount importance. However, as is evident from the above description of a conventional H.263 process, repeated memory accesses are performed to effect the motion compensation and prediction operations. For example, referring to FIGS. 2 and 3, each pixel in array signal edgeframe is written once (by process 8) and read twice (in processes 9, 12) for each decoded frame. Similarly, referring to FIG. 2, each pixel in array signal Bframe is written three times (in processes 12, 14, 16) and read twice (in processes 14 and 16) for each decoded frame, and each pixel in array signal newframe is written twice (in processes 9, 10) and read once (in process 14).

In this regard and by way of further background, the impact of memory-related power consumption in video and image processing is described in F. Catthoor, et al., "Global Communication and Memory Optimizing Transformations for Low Power Signal Processing Systems", *VLSI Signal*

Processing VII, (IEEE, 1994), pp. 178–187. This paper further discloses that transformations of the video decoding specifications can obtain significant power reduction in and of themselves. Examples of transformations to optimize memory access operations, from the standpoint of power reduction, are disclosed. However, the implementation of these concepts into a particular video decoding scheme, such as those based on the H.263 standard, is not discussed in this article; it is believed that such implementation has not heretofore been disclosed or effected in the art.

BRIEF SUMMARY OF THE INVENTION

It is therefore an object of the present invention to provide a computer system and a method of operating the same in which the power requirements for decoding compressed video bitstream information are greatly reduced.

It is a further object of the present invention to provide such a system in which such power reduction is obtained at least in part through selection of memory organization.

It is a further object of the present invention to provide such a system and method in which the frequency of memory accesses in effecting video decoding is greatly reduced, thus resulting in power reduction.

It is a further object of the present invention to provide such a system and method that is particularly suited for mobile computing applications.

It is a further object of the present invention to provide such a system and method that is particularly suited for decoding of compressed video information under battery power.

Other objects and advantages of the present invention will be apparent to those of ordinary skill in the art having reference to the following specification together with its drawings.

The present invention may be implemented in an electronic system in which memory operations necessary for video decoding are greatly reduced, thus reducing power dissipation. Specifically, the present invention may be implemented by organizing the memory of the video decoder in a hierarchical manner, in particular with the size of buffer memories selected for use as on-chip memory with the logic circuitry that is performing the video decoding. The invention may further be implemented to eliminate many of the additional memory accesses necessary for generation of the border array blocks used in determining motion vectors. Additionally, the present invention may be implemented so that new predicted frame data is stored, as generated, in the same memory space as the previous predicted frame data, with a selected group of overlapping blocks copied into an on-chip buffer. The video decoding method may also be implemented in a manner to combine, in program loops and functions, the bidirectional prediction of the B and P frames to reduce the frequency of memory accesses. In addition, in-place storage in memory of prior and current frames may be implemented, through use of an intermediate buffer for new predicted blocks, to reduce chip area overhead of the video decoding system. It is contemplated that the present invention will not only reduce the power dissipation of the video decoding system, but also improve system performance.

BRIEF DESCRIPTION OF THE SEVERAL VIEWS OF THE DRAWING

FIG. 5 is a pictorial representation of a video decoding method according to a first preferred embodiment of the present invention.

FIG. 8d is a memory map illustrating the arrangement of a border buffer in on-chip memory for storing edge pixel data according to the preferred embodiment of the present invention.

FIGS. 9a through 9c are pictorial representations of memory requirements for prior and current predicted P frames, illustrating the location of information that is no longer needed or not yet written.

DETAILED DESCRIPTION OF THE INVENTION

Figure 1:
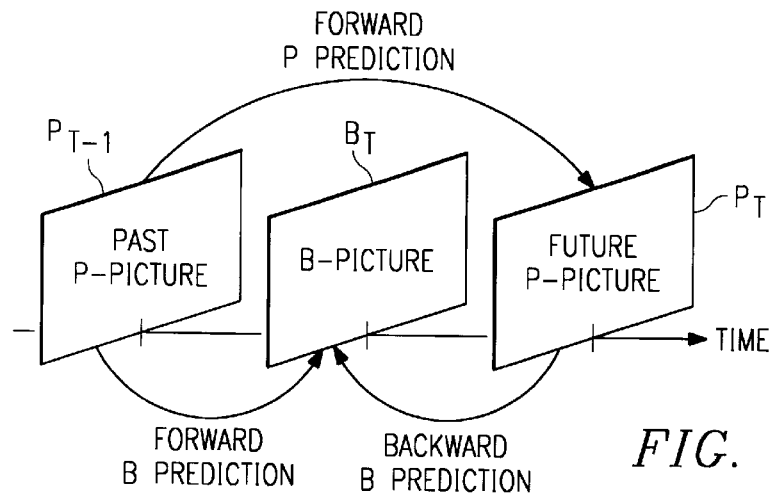
FIG. 1 is a pictorial representation of conventional B-frame and P-frame prediction according to the conventional H.263 standard.
Figure 4:
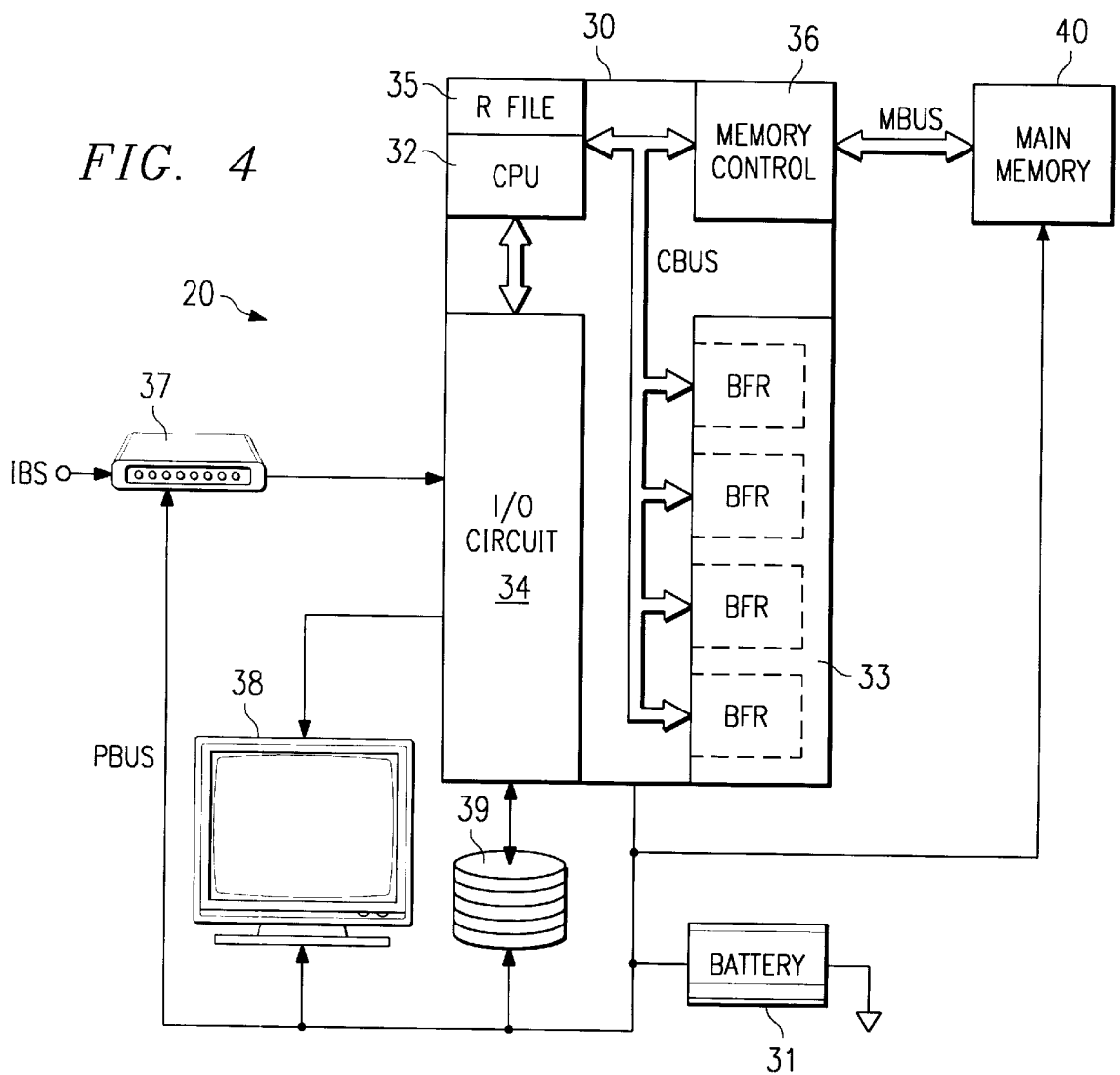
FIG. 4 is an electrical diagram, in block form, of a video decoding system according to the preferred embodiment of the invention.

Referring now to FIG. 4, the construction of video decoder system 20 according to the preferred embodiment of the present invention will now be described. Exemplary system 20 is illustrated as a battery-powered computer system, including a highly integrated main integrated circuit 30 (i.e., a so-called "system-on-a-chip"), as may be realized in a notebook-sized or other portable computer system, considering that the present invention is particularly beneficial when applied to power-sensitive systems such as battery-powered systems. Alternatively, video decoder system 20, including functions of main integrated circuit 30, may be implemented as a board-level subsystem in a larger system, including realizations where main frame memory and other global system architecture functions are realized off-chip from the video decoding processing unit. It is of course contemplated that the present invention may also be useful in and beneficial to systems of other configurations, including desktop workstations, home entertainment centers, and the like. Furthermore, this exemplary video decoder system 20 is realized by way of a general-purpose central processing unit (CPU) 32 in main integrated circuit 30 that executes a computer program to perform the operations described hereinbelow; it is to be understood, of course, that the present invention may be alternatively realized in custom logic or hardware for performing the video decoding operations described herein.

As noted above, system 20 includes main integrated circuit 30 which, as a single integrated circuit chip, embodies much of the important operating circuitry to be used in operating the system, including CPU 32. CPU 32 is a general purpose microprocessor core for executing various data processing instructions, including those for performing the video decoding operations described herein; alternatively, CPU 32 may be implemented as a digital signal processor (DSP) core, or as custom or semi-custom logic for performing the decoding processes described herein. Main integrated circuit 30 also includes input/output circuitry 34 which interfaces to various peripheral devices in system 20, including network interface 37 for receiving the input video bitstream IBS. Network interface 37 may be implemented as a high-speed analog or digital modem, as an interface card for a local-area or wide-area network, and the like, depending upon the application; specifically, where system 20 is implemented as a portable computing system, network interface 37 is preferably implemented as a wireless, or cellular, modem. Input/output circuitry 34 also interfaces, either directly or indirectly via controller cards and busses (e.g., PCI bus, PS/2 bus, EIDE bus) to video display 38, to disk storage device 39, and to other input/output devices (not shown) in system 20 such as the keyboard, pointing device, and the like. Battery 31 in system 20 powers main integrated circuit 30, as well as the peripheral devices 37, 38, 39 by way of power bus PBUS, as shown in FIG. 4.

System 20 according to the preferred embodiment of the invention includes multiple storage resources that are implemented by way of solid-state memory, and that are accessible to CPU 32. Firstly, CPU 32 itself includes register file 35 which, as is typical in modern central processing units, provides temporary storage for input data and output results of the data processing operations executed by CPU 32. In this embodiment of the invention, CPU 32 is connected to bus CBUS within main integrated circuit 30 to interface with on-chip shared memory 33 and memory controller 36. Shared memory 33 includes storage locations for buffers BFR which will be used in the video decoding operations described hereinbelow; on-chip shared memory 33 may also include various levels of cache memory and the like as useful with modern CPU cores. Shared memory 33 is preferably realized as one or more arrays of static random-access memory, as is conventional for cache memories of modern CPU integrated circuits. The preferred organization of shared memory 33, and particularly the sizes of storage locations for the various ones of buffers BFR, will be described in further detail hereinbelow.

Memory controller 36 in main integrated circuit 30 is also connected to on-chip bus CBUS, as noted above, and in turn is connected to off-chip main memory 40 via memory bus MBUS. Of course, main memory 40 may alternatively be implemented on-chip with main integrated circuit 30, but at a "higher" hierarchical level from shared memory 33, particularly in the decoding of QCIF format data. Main memory 40 may be implemented as high density dynamic random access memory (DRAM), and typically has a high capacity such as on the order of tens of megabytes. Memory controller 36 is operable to detect whether a memory access request by CPU 32 issued on bus CBUS is directed to an on-chip memory resource, such as in shared memory 33, or to an off-chip memory resource in main memory 40. For accesses to main memory 40, memory controller 36 generates the appropriate physical addresses and control signals, and handles the output data or input data, as the case may be, to effect the requested memory access.

Figure 2:
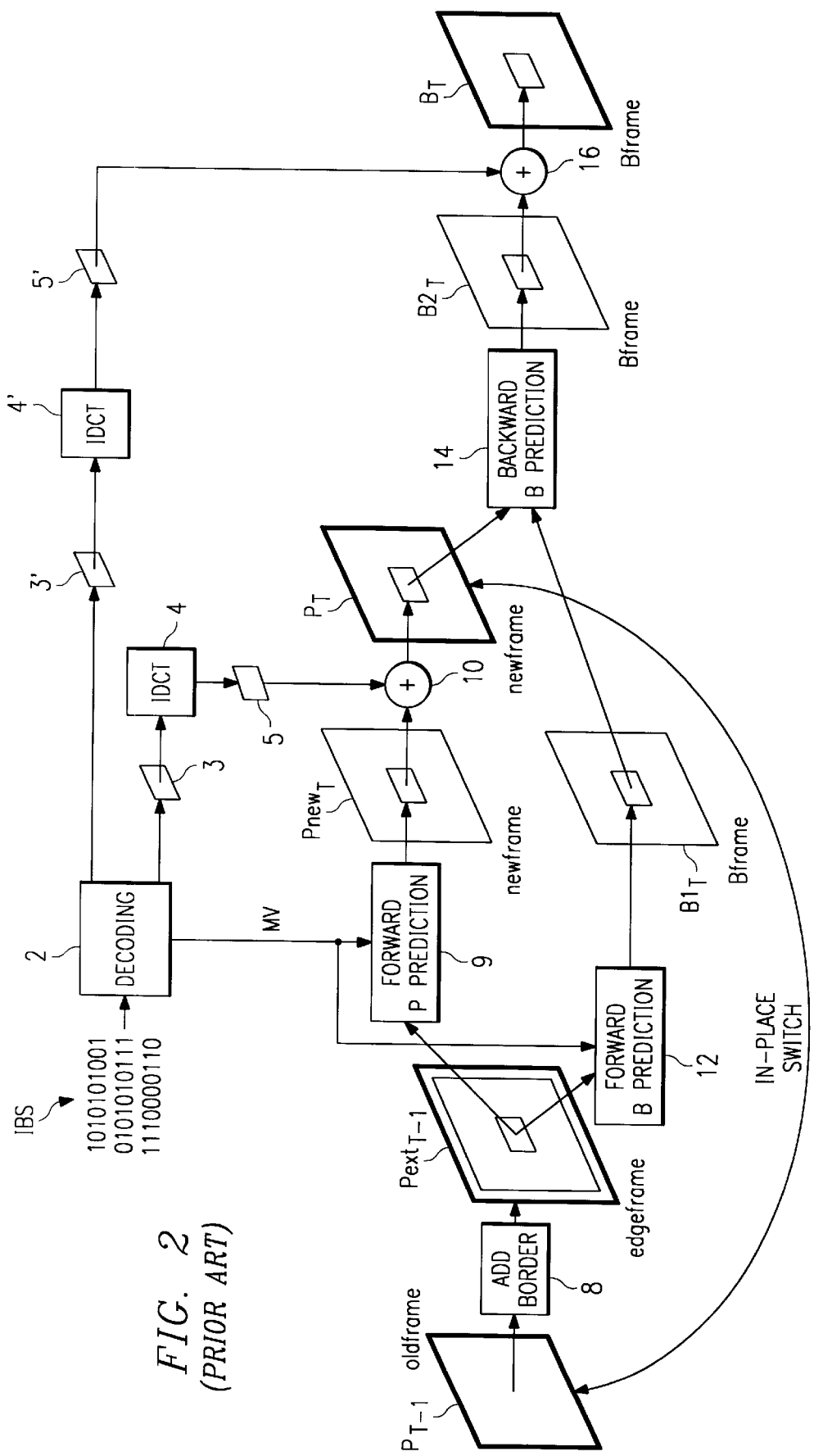
FIG. 2 is a pictorial representation of a conventional video decoding method according to the H.263 standard.

Referring now to FIG. 5 in combination with FIG. 4, a method of decoding compressed video signals according to a first preferred embodiment of the invention will now be described in detail. The method illustrated in FIG. 5 may be performed by system 20 of FIG. 4, particularly through the operation of main integrated circuit 30 contained therein. In this example, the compression and decompression is according to the H.263 standard. FIG. 5 is in the form of a data and process flow diagram, similar to that utilized hereinabove relative to FIG. 2, and as used in Nachtergaele, et al., "Low power data transfer and storage exploration for H.263 video decoder system", *Proceedings of IEEE VLSI Signal Processing Conference* (IEEE, Oct. 30, 1996), pp. 115–124, which is incorporated herein for all purposes by this reference.

As illustrated in FIG. 5, input bitstream IBS is received by network interface 37 and input/output circuitry 34, and forwarded to CPU 32 for decoding in process 42. Decoding process 42 decodes the input bitstream in the conventional manner, such decoding including lossless decoding and other techniques conventionally used in video compression, and results in the separation of motion vectors MV, P macroblock 43, and B macroblock 43', stored in corresponding buffers Pblock, Bblock in buffers BFR of shared memory 33 in main integrated circuit 30 of FIG. 4.

Also as illustrated in FIG. 5, a current macroblock being processed, and its neighboring macroblocks, all from previous predicted P frame $P_{T-1}$ are retrieved from array signal oldframe in main memory 40, and stored in buffer 44 in shared on-chip memory 33, for application to combined forward P and B prediction process 46. As is evident from a comparison of FIG. 5 to FIG. 2 discussed above, no border is applied to the retrieved P frame $P_{T-1}$ according to the preferred embodiment of the invention in this retrieval. However, unrestricted motion vectors (i.e., not restricted to the displayable frame) are still permitted according to the preferred embodiment of the invention, as will be described hereinbelow.

Figure 3:
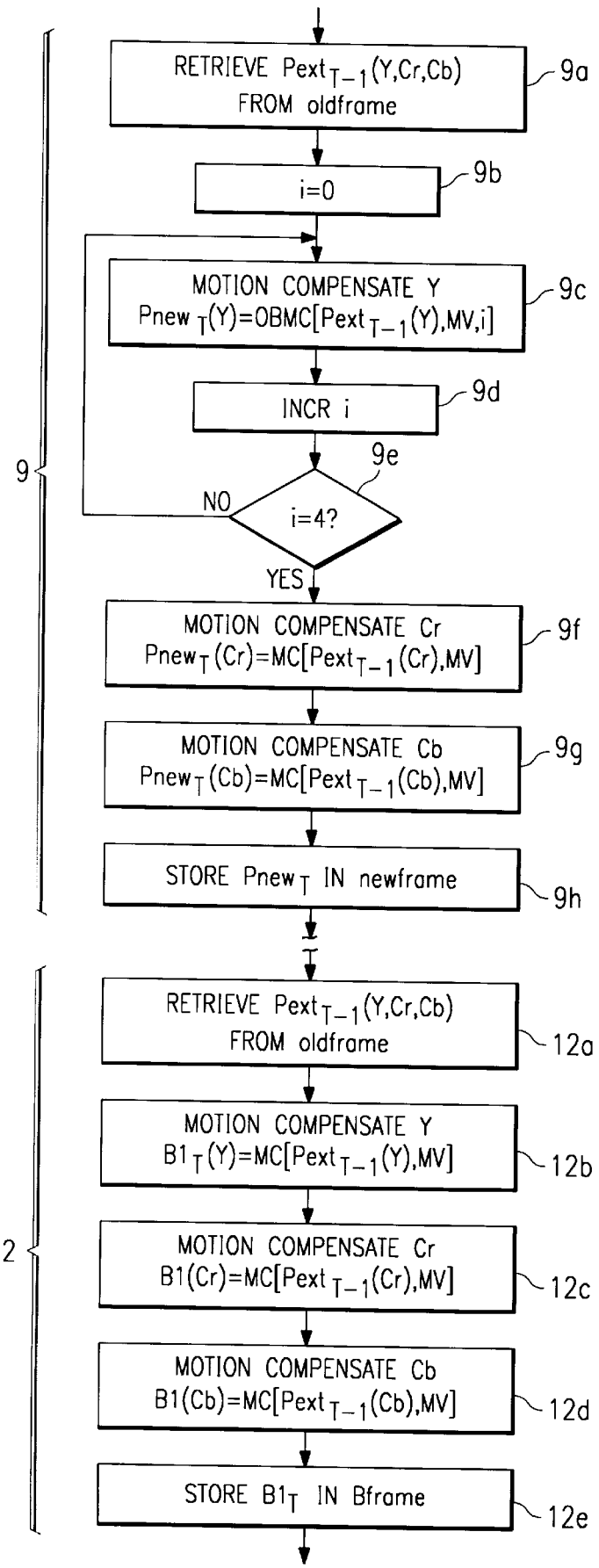
FIG. 3 is a flow chart illustrating the operation of forward P prediction and forward B prediction operations in the conventional video decoding method of FIG. 2.

Referring to FIG. 5, CPU 32 now performs combined forward P and B prediction process 46. According to the preferred embodiments of the present invention, process 46 is executed by CPU 32 in such a way as to greatly reduce the number of memory access required, particularly relative to the conventional approach described hereinabove relative to FIG. 3. In particular, the memory accesses are reduced primarily through reordering and combining of the P and B prediction loops as will now be described relative to FIG. 6. Also according to the present invention, the number of memory accesses may be reduced according to a complementary approach utilizing a data flow transformation that fully avoids the use of main memory or intermediate storage of border and edge data; this approach may be used independently of, or in combination with, the reordering and combining of the P and B prediction loops. The process of FIG. 6 will be described for an individual macroblock, it being understood that the steps illustrated in FIG. 6 will be repeated for each of the macroblocks in the frame.

Figure 6:
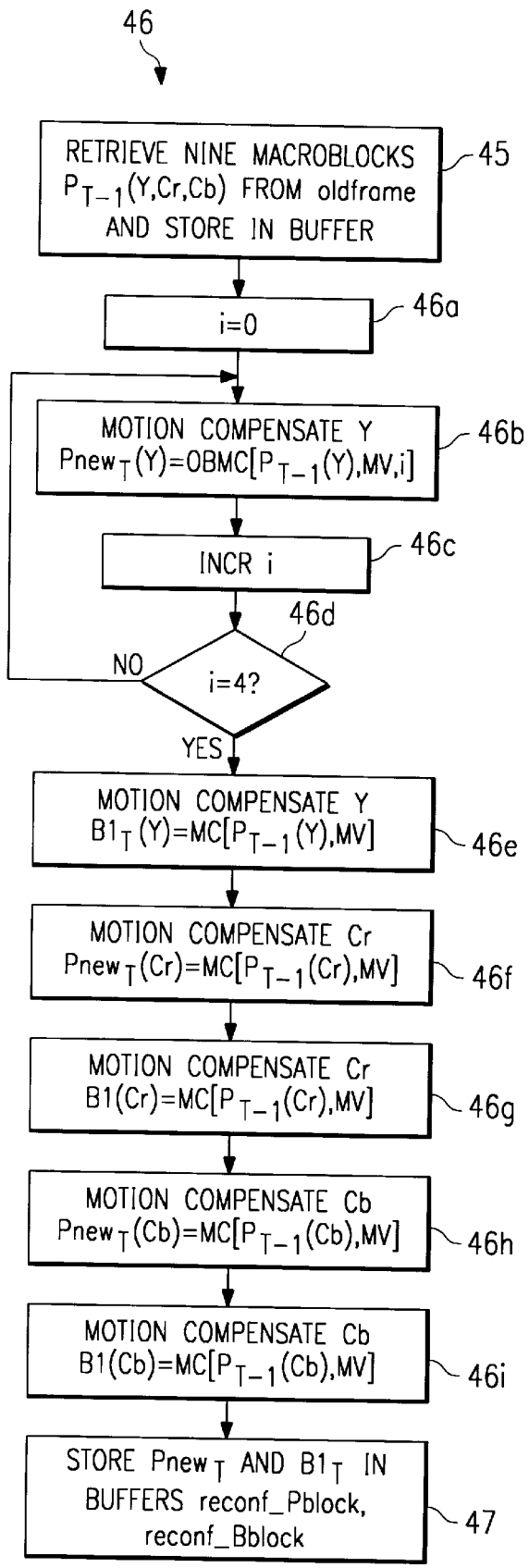
FIG. 6 is a flow chart illustrating the operation of the combined forward P and B prediction method according to the preferred embodiments of the invention.
Figure 7:
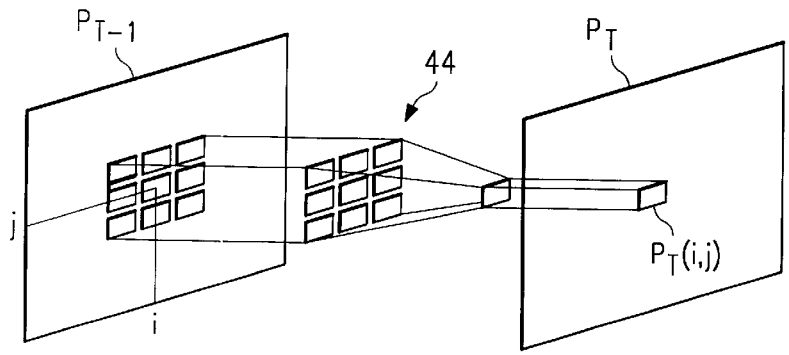
FIG. 7 is a pictorial representation of the use of a macroblock buffer in the prediction process and memory utilization for a macroblock of frame data according to the preferred embodiments of the invention.

As shown in FIG. 6, CPU 32 first executes process 45 to retrieve one or more macroblocks of previous P frame $P_{T-1}$ from array signal oldframe in main memory 40, for storage in buffer 44 in memory 33. FIG. 7 illustrates that, according to the preferred embodiment of the invention and consistent with the H.263 standard, prediction of the macroblock $P_T(i,j)$ in the ith column and jth row of the frame utilizes the nine macroblocks $P_{T-1}(i-1,j-1)$ through $P_{T-1}(i+1,j+1)$ from the prior predicted frame $P_{T-1}$. As such, process 45 in this example retrieves the nine appropriate macroblocks $P_{T-1}(i-1,j-1)$ through $P_{T-1}(i+1,j+1)$ for storage in buffer 44. Each of the memory retrieval operations performed in combined forward P and B prediction process 46 are then performed relative to this buffer 44, and not to main memory 40, thus significantly reducing the power dissipation of system 20 in this regard. This buffering operation, provided according to the preferred embodiment of the invention, effectively assigns temporary values to a lower level in the memory hierarchy (e.g., buffer 44) for values that are to be read more than once, such as the nine appropriate macroblocks $P_{T-1}$ (i–1,j–1) through $P_{T-1}$(i+1,j+1). Buffering in this manner may also be applied to write operations, as will be evident from the following description, in which a signal that is assigned to a higher level and that is made up of several contributions, for example a predicted frame, is not written to the higher level memory until the final result is obtained; intermediate stages are instead retained in lower level memory, such as buffers in shared memory 33.

Referring back to FIG. 7, it will be understood by those skilled in the art having reference to this specification that accesses beyond the 3×3 neighborhood of a specific block may be required in OBMC mode; accordingly, a check is required in the function that accesses buffer 44 to retrieve a pixel from main memory 40, in the event that the desired pixel is not present in buffer 44; this event is expected to occur very rarely, considering that most motion vectors are quite small and thus almost always point to a location within the 3×3 neighborhood.

In this example, prediction process 46 first performs OBMC compensation in the forward prediction of the P-frame for the current macroblock. In FIG. 6, this compensation is performed, after initialization of index i in process 46a, by four passes through a loop including motion compensation process 46b as applied to the luminance (Y) information in previous frame $P_{T-1}$ in combination with the appropriate motion vectors MV, to generate luminance (Y) information stored in connection with frame $Pnew_T$; index incrementing process 46c and decision 46d determine when the four OBMC passes are complete. As described hereinabove, motion compensation process 46b involves the calling and executing, by CPU 32, of the appropriate motion compensation function (OBMC, in FIG. 6), to generate luminance (Y) information for the macroblock of intermediate predicted P frame $Pnew_T$ which is stored in another buffer in shared memory 33 as will be noted below.

As is known in the art, the unrestricted motion vector mode according to the H.263 standard permits motion vectors (i.e., vector representations of differences in position between video frames) to "point" from locations within the displayable frame to locations outside of the displayable frame, even though the video system is not capable of displaying the resultant object. This mode results in smoother video sequences when displayed, as edge effects in the displayed video images are much reduced. However, as noted above, conventional video decoder systems have effected unrestricted motion vector mode simply by adding, to the memory required in the storage of a prior predicted frame $P_{T-1}$, and storing an extended prior frame $Pext_{T-1}$ in memory (as array signal extframe of FIG. 2) that consists of the prior predicted frame $P_{T-1}$ plus its border regions. For example, an additional forty-four macroblocks of memory capacity is conventionally required to store extended prior frame $Pext_{T-1}$, as compared to prior predicted frame $P_{T-1}$.

According to the preferred embodiment of the invention, however, dependencies on the border data may be checked by conditions upon the position of the pixels to be read; this permits the original frame pixels to be read from boundary rows and columns of P frame $P_{T-1}$ in lieu of reading the copies of those pixels that are stored in the border data. This checking is preferably performed in a context-dependent manner, with local buffering in buffers BFR of on-chip memory 33 used for the storage of temporary copies. As a result, the large border area used in conventional H.263 decoding is not required in order to handle unrestricted motion vectors, as will now be described relative to FIGS. 8a through 8c.

Figure 8A:
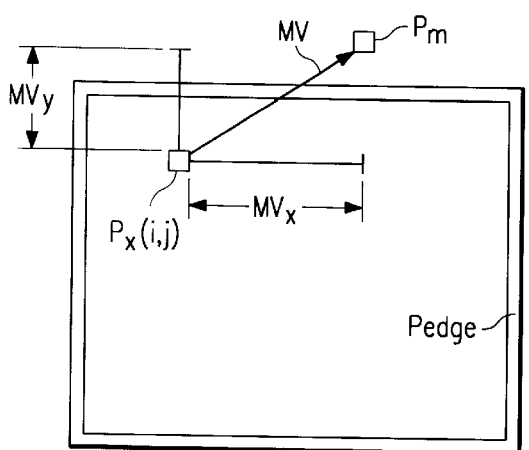
FIGS. 8a and 8b are pictorial representations of the operation of effecting unrestricted motion vectors according to the present invention.

In FIG. 8a, prior predicted frame $P_{T-1}$ is illustrated pictorially, and contains pixel Px(i,j) that is associated with a motion vector MV. Motion vector MV has x and y components MVx, MVy, respectively, which point to pixel Pm; in this example, pixel Pm resides outside of the displayable area defined by frame $P_{T-1}$. According to this preferred embodiment of the invention, as illustrated in FIG. 5, no memory location stores the information corresponding to pixel Pm that is outside of the displayable frame; this is in contrast to the conventional video decoding process illustrated in FIG. 2, where this pixel would be stored within extended prior predicted P frame $Pext_{T-1}$ in array signal extframe. Forward prediction process 46 requires information for pixel Pm in order to predict the P and B frames, however; the generation of this information according to the preferred embodiment of the invention will now be described relative to FIG. 8b.

Figure 8C:
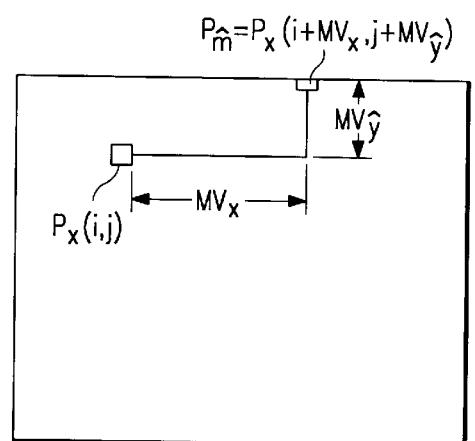
FIG. 8c is a flow chart illustrating the operation of effecting unrestricted motion vectors so as to permit border removal according to the preferred embodiments of the present invention.
Figure 8B:
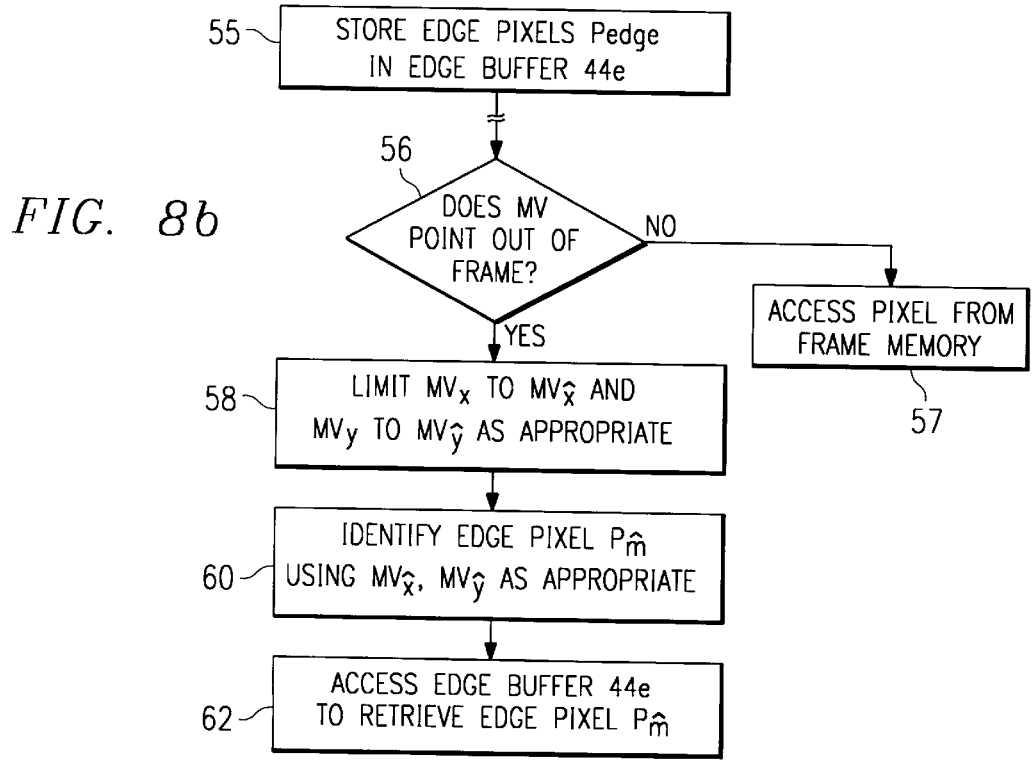

As illustrated in FIG. 8b, and in connection with FIGS. 5 and 8a, process 55 is performed by CPU 32 to initially store edge pixels from prior frame $P_{T-1}$ in one of buffers 44, namely in edge buffer 44e. Process 55 is preferably performed once for each frame $P_{T-1}$, and is applied to the processing of each macroblock upon which combined P and B prediction process 46 is performed. According to this embodiment of the invention, only the pixels $P_{edge}$ that are at the very edge of prior frame $P_{T-1}$ are stored in edge buffer 44e and, considering that only luminance information is used in motion compensation, only the luminance information (Y) for each of edge pixels $P_{edge}$ is retrieved from main memory 40 (from array signal oldframe) and is stored in edge buffer 44e. Edge buffer 44e is, of course, contained within on-chip shared memory 33 in main integrated circuit 30, for speedy and low power access.

Edge buffer 44e may be a relatively small portion of on-chip memory 33, given the reduced amount of information to be stored therein. In the example of QCIF format video, in which each frame is 144 pixels by 176 pixels (i.e., nine by eleven macroblocks of six blocks of eight by eight pixels, with chrominance information decimated as (4:2:0), as is known). FIG. 8d illustrates an exemplary arrangement of edge buffer 44e, with portions TOP BFR and BOTTOM BFR each containing 176 bytes of information corresponding to the luminance data for the top and bottom edge pixels, respectively, of frame $P_{T-1}$; portions LEFT BFR and RIGHT BFR each contain 144 bytes of information corresponding to the luminance data for the left and right edge pixels, respectively, of frame $P_{T-1}$. In this example, edge buffer 44e may be readily implemented as a 640 byte portion of on-chip memory 33, which of course is significantly smaller and more rapidly accessed than the forty-four macroblock border storage in main memory 40 utilized according to conventional processes.

Referring back to FIG. 8b, the remaining processes 56 through 62 are preferably performed by CPU 32 within luminance motion compensation process 46b. In this regard, CPU 32 first performs decision 56 to determine if the motion vector MV retrieved in decoding process 2 associated with the current pixel (e.g., pixel Px(i,j) of FIG. 8a) points to a pixel location outside of the displayable frame $P_{T-1}$, for example as illustrated in FIG. 8a. If not (decision 56 is NO), the pixel to which the motion vector MV points is retrieved from array signal oldframe in main memory 40, in process 57, and is used in the forward prediction of frame $P_T$ in the conventional manner.

On the other hand, if motion vector MV points to a pixel location that is outside of displayable frame $P_{T-1}$ (i.e., decision 56 is YES), CPU 32 next performs process 58 in which the components MVx, MVy of motion vector MV are analyzed to determine which, if not both, components MVx, Mvy are directed outside of the displayable range. In the example of FIG. 8a, component MVx is within the displayable range of frame $P_{T-1}$, while component MVy exceeds the top range of frame $P_{T-1}$. According to the preferred embodiment of the invention, CPU 32 modifies component MVy in process 58 to a value MV ŷ, which is a y-direction distance that is limited to the edge of frame $P_{T-1}$. The components MVx, MV ŷ for the example of FIG. 8a are illustrated in FIG. 8c. Of course, mf pixel Pm is outside of the displayable range in the x-direction, component MVx will be similarly modified to an edge value MVx̂.

CPU 32 then performs process 60 to identify a modified pixel Pm̂ that resides at the edge of frame $P_{T-1}$ and which has coordinates that correspond to the sum of the current pixel Px(i,j) and the motion vector MV as modified by process 58. In the example of FIGS. 8a and 8c, modified pixel Pm̂ corresponds to the pixel Px(i+MVx, j+MVŷ), which resides at the edge of frame $P_{T-1}$. Upon identifying edge pixel Pm̂, CPU 32 performs process 62, in which the luminance information for modified pixel Pm̂ is retrieved from edge buffer 44e for use in motion compensation process 46b, in the conventional manner. In the example of FIGS. 8a and 8c, this information will be retrieved from portion TOP BFR of edge buffer 44e, due to the location of pixel Pm̂ along the top edge of frame $P_{T-1}$.

The edge buffer process described hereinabove relative to FIG. 8b is believed to be particularly beneficial when implemented by a fixed processor which does not permit complex conditional checks on addresses. According to an alternative embodiment of the present invention, elimination of the border may be accomplished through use of an address filter. Such an address filter is preferably implemented by way of special hardware, particularly where CPU 32 is realized by way of a custom integrated circuit, in which the address filter function is contemplated to occupy negligible chip area; alternatively, the address filter function may be implemented through software operating on a general purpose processor, although the cost in cycles may be large. According to this alternative implementation, the desired pixel address is translated directly into the address of an edge pixel, during either a read of the border pixel from main memory (for the initial read) or a read of registers in which the most recently-read border pixels have been saved. As a result, no edge buffer 44e is necessary for the storage of a copy of the edge pixels $P_{edge}$, but instead the pixel data resides in either main memory 40 or a register resource for the desired edge pixel, which may be directly accessed. This address filtering and translation according to this alternative implementation may be used in the processing of both luminance and chrominance information. It is contemplated that this alternative realization will be particularly beneficial where CPU 32 is realized by a custom processor, as the chip area required for implementation of edge buffer 44e will be avoided, while still retaining the benefit of avoiding the large majority of duplicate accesses to the border pixels in main memory 44 as will now be discussed.

Upon the implementation of either the retrieval process of FIG. 8b or the application of the address filter described above, it is contemplated that the number of accesses to "border" data will be reduced significantly, considering that the memory accesses required in making the border copies of pixel data (typically 16896 write accesses plus the necessary reads, for QCIF format) are avoided. Moreover, in the accessing of the border blocks during motion compensation, very few accesses are required when context-specific boundary checking conditions are introduced into the reconstruction function. For example, one may assume that the overall average reduction at the borders is by about a factor of eight. This is realistic considering that motion vectors are small and non-uniformly distributed over between zero to fifteen pixel positions; one can thus safely assume a uniform range of motion over ±7 pixels that indicates, on the average, that the number of pixels residing outside the border is about ⅛ of the number of pixels inside the border. Based on this assumption, in the QCIF format, one may conclude that the number of read accesses is reduced by 16,128 relative to the conventional generation of the border; this conclusion is, of course, data dependent. While the context-dependent checking described hereinabove requires more complex program code and also additional activity on the part of CPU 32 relative to conventional border storage, it is contemplated that the power consumption saved by reducing the number of accesses to main memory 40 through elimination of the border will still be significant, such as on the order of 24% to 27% according to modern technology, considering that both the number of memory transfers and the size of the frame (i.e., no border) are significantly reduced.

Referring back to FIG. 6, according to this embodiment of the invention, upon completion of motion compensation process 46b for the fourth pass, including retrieval of edge pixels from edge buffer 44e as needed, process 46e is next performed to effect motion compensation prediction of luminance (Y) information for generation of the B frame $B1_T$. Process 46e is executed by CPU 32 in retrieving the luminance information of the current macroblock of previous frame $P_{T-1}$ from buffer BFR, and calling and executing the motion compensation function (MC) upon this information in combination with the decoded motion vectors, to generate luminance (Y) information for predicted B-frame $B1_T$, which is also stored in a buffer in shared memory 33, as will be noted below.

Process 46f is then executed by CPU 32 to effect motion compensation of chrominance (Cr) information in the current macroblock of previous frame $P_{T-1}$ for use in predicted P-frame Pnew$_T$, followed by the execution of process 46g to effect motion compensation of chrominance (Cr) information in the current macroblock of previous frame $P_{T-1}$ for use in predicted B-frame $B1_T$. Similarly, process 46h is performed by CPU 32 to effect motion compensation of chrominance (Cb) information in the current macroblock of previous frame $P_{T-1}$ for use in predicted P-frame Pnew$_T$, followed by the execution of process 46i to effect motion compensation of chrominance (Cb) information in the current macroblock of previous frame $P_{T-1}$ for use in predicted B-frame $B1_T$.

As indicated in FIG. 6, process 47 is executed by CPU 32 to store the resulting macroblocks of frames Pnew$_T$ and $B1_T$ in buffers BFR within shared memory 33. Process 47 may be effected as a separate step as shown in FIG. 6, or alternatively may be executed within each of processes 46b, 46e, 46f, 46g, 46h, 46i as completed. In either event, upon the completion of process 46, buffer reconf_pblock in shared on-chip memory 33 retains the luminance (Y) and chrominance (Cr, Cb) data for the current macroblock of predicted P-frame Pnew$_T$, while buffer reconf_bblock in shared on-chip memory 33 retains the luminance (Y) and chrominance (Cr, Cb) data for the current macroblock of predicted B-frame $B1_T$. These intermediate frames $Pnew_T$, $B1_T$ are to be used in subsequent processing, as will be described hereinbelow, without requiring accesses to main memory 40, thus reducing the power requirements in system 20.

Furthermore, as is evident from the foregoing description of FIG. 6, process 46 according to the preferred embodiments of the invention in which forward P-prediction and forward B-prediction are combined through restructuring of their program loops, involve only a single array access to main memory 40 for each macroblock, as carried out in process 45. The full measure of improvement also preferably includes the expansion of certain functions, the general methodology of which is described in F. Catthoor, et al., "Global Communication and Memory Optimizing Transformations for Low Power Signal Processing Systems", *VLSI Signal Processing VII*, (IEEE, 1994), pp. 178–187; S. Wuytack, et al., "Global communication and memory optimizing transformations for low power systems", *International Workshop on Low Power Design* (IEEE, 1994), pp. 203–208; and U.S. patent application Ser. No. 08/163,819, filed Dec. 8, 1993, all of which are incorporated herein by this reference. This is a significant improvement over conventional techniques, as described hereinabove relative to FIG. 2, in which each of the B and P prediction processes each access the same previous P-frame $P_{T-1}$ from main memory. Especially considering the rate at which these accesses occur in the decompression and decoding of video streams, the elimination of this redundant memory access to retrieve the contents of array signal oldframe significantly reduces the power requirements, especially when combined with the elimination of the frame border as described hereinabove.

According to the preferred embodiment of the invention, decoded P macroblock 43 is retrieved from buffer Pblock and applied, by CPU 32, to inverse discrete cosine transform (IDCT) process 49 to produce transform P block 51, which is stored in another buffer, namely buffer IDCT_Pblock, in shared on-chip memory 33. Of course, while process 49 in this embodiment effects an inverse DCT, other transform coding types known in the art (and, additionally, any one of several variants of the DCT) may alternatively be used. The current macroblock of predicted frame $Pnew_T$, stored in buffer reconf_pblock, is then summed by CPU 32 with P block 51, in process 48, to produce the full current predicted macroblock of P frame $P_T$. The actual summing operation performed by CPU 32 in process 48 stores the predicted macroblock of P frame $P_T$ in buffer new_Pblock, which is within shared memory 33 of main integrated circuit 30, for use in backward B prediction process 50 as will be described hereinbelow. Additionally, and upon completion of summing process 48, CPU 32 and memory controller 36 of main integrated circuit 30 store the macroblock contained within buffer new_Pblock in main memory 40, as the corresponding macroblock in array signal newframe; this storing operation may be done separately from the continued decoding processes, at such time as memory bus MBUS becomes available in system 20.

Backward B prediction process 50 is then performed by CPU 32, using the predicted macroblock of intermediate B frame $B1_T$ that is stored in buffer reconf_bblock, and also the recently predicted macroblock of frame PT that is stored in buffer new_Pblock. According to the preferred embodiment of the present invention, backward B prediction process 50 need not and does not retrieve the contents of array signal newframe to retrieve the appropriate macroblock of current predicted P frame $P_T$, in contrast to conventional techniques which access main memory both in retrieving the intermediate B frame and the predicted P frame, and in storing the backward predicted B frame, as discussed hereinabove relative to FIG. 2. Accordingly, the predicted P frame $P_T$ is written only once into main memory 40 array signal newframe, and is not read therefrom until such time as the decoding of the next frame is to take place (i.e., when current predicted P frame $P_T$ becomes previous predicted frame $P_{T-1}$). The power requirements of system 20 are thus reduced by the provision of buffers BFR in shared on-chip memory 33, as the necessity to retrieve current P frame $P_T$ for use in backward B prediction process 50 is eliminated.

Backward B prediction process 50 results in a macroblock in a second intermediate B frame $B2_T$, which is stored in another one of buffers BFR in shared on-chip memory 33 of main integrated circuit 30, namely in buffer reconb_bblock, for use in summing process 52. As noted above, buffer Bblock contains decoded B macroblock 43' as retrieved and decoded from input bitstream IBS; decoded B macroblock 43' is applied to IDCT process 53 by CPU 32, resulting in transform B macroblock 54 which is stored in buffer IDCT_Bblock in shared memory 33. Upon completion of backward B prediction process 50, CPU 32 retrieves transform B macroblock 54 from buffer IDCT_Bblock, and sums macroblock 54 with the current macroblock of intermediate predicted B frame $B2_T$, retrieved from buffer reconb_Bblock, in process 52, to generate a macroblock in the current predicted B frame BT. Buffer new_Bblock in shared on-chip memory 33 is used to temporarily store each macroblock resulting from summing process 52 as generated, following which the predicted macroblock is written to main memory 40 in connection with array signal Bframe, as a portion of predicted B frame $B_T$. As in the case of combined P and B prediction process 46 described hereinabove, this access of buffers within shared memory 33 as performed in process 50 according to this embodiment of the invention, avoids accesses to main memory 40 and is thus contemplated to provide significant reduction in system power dissipation.

The contents of array signals newframe and Bframe, corresponding to predicted P frame $P_T$ and predicted B frame $B_T$, respectively, may now be used by CPU 32 and input/output circuitry 34 to produce the current image frame for display on graphics display 38, in the conventional manner for H.263 video decoding and display.

According to this first embodiment of the invention, therefore, it is contemplated that significant power reduction is obtained. This conclusion is based upon the simulation of the operation of a system constructed and operated according to the present invention, using a set of switched capacitance equations to model the power dissipation. In general, the switched capacitance equations have the form:

$$C_{pd} = A_0 + A_1 r + A_2 c + A_3 rc + A_4 r^2 + A_5 c^2 + A_6 w$$

where r corresponds to the number of rows in the memory, c corresponds to the number of columns of the memory, w corresponds to the word length of the memory, and where the $A_i$ values are constants determined by the particular construction and technology by way of which the memory is constructed. The $A_i$ values may be characterized by using assumptions about the memory activity, for example with 50% of the cycles corresponding to reads and 50% writes, with each cycle including 50% of the word length (inputs for writes, and outputs for reads), and 50% of the address bits as toggling in any cycle. The $A_i$ values will vary, of course, between on-chip memory 33 and main memory 40; additionally, however, as is evident from the foregoing model, the power dissipation is highly dependent upon the size of the particular memory resource (i.e., the values of r, c, and w).

Firstly, it has been observed through simulation using this switched-capacitance model that the removal of the border as described hereinabove relative to FIG. 8a provides on the order of a sixteen percent reduction in the power dissipation of system 20 in the video decoding operation. The loop transformations described hereinabove relative to the combined P and B forward prediction process 46, illustrated by way of example in FIG. 6, have been observed through simulation to provide on the order of an additional forty percent reduction in power dissipation, by removing the redundancy of external frame accesses. The use of buffers reconf_Pblock and reconf_Bblock, rather than main memory 40, to store the results of the combined P and B forward prediction process 46 prior to summing with the IDCT transform blocks, has been observed through simulation to provide an additional twenty-five percent reduction in power dissipation. General use of buffers BFR in shared-memory 33 to store intermediate results, delaying the accesses to main memory 40 until completion of predicted P frame $P_T$ and predicted B frame $B_T$, in the manner described by way of example relative to FIG. 5, has been observed through simulation to provide an additional thirty-seven percent reduction in power dissipation. These significant reductions in the power requirements of system 20 in video decoding are expected to have a dramatic impact on the useful life of battery 31 in system 20.

According to a second embodiment of the invention, which includes the foregoing features of reduced power dissipation, additional efficiency in the chip area is expected to be obtained by reducing the extent to which macroblocks of predicted frames are retained in main memory 40 by the in-place storage of past and future predicted P frames, as will now be described, beginning with FIGS. 9a through 9c.

FIG. 9a pictorially illustrates the contents of an exemplary prior predicted frame $P_{T-1}$ as stored in main memory 40; according to conventional approaches, as noted above, prior frame $P_{T-1}$ is in association with array signal oldframe. In this representation, frame $P_{T-1}$ is according to the QCIF format, and as such contains nine rows (y=1 to y=9) of eleven (x=1 to x=11) macroblocks in this representation. At the point in time illustrated in FIG. 9a, macroblock $P_{T-1}(i,k)$ in the jth column and kth row is the macroblock upon which combined P and B prediction process 46 described hereinabove is currently operating. As illustrated in FIG. 6, this process also requires the eight surrounding macroblocks (x=k±1,y=j±1) from prior frame $P_{T-1}$ to be used in the prediction of macroblock $P_T(j,k)$.

In this example, the processing of macroblocks $P_{T-1}(x,y)$ proceeds in an x-fast order, such that the next macroblock to be processed will be $P_{T-1}(j+1, k)$, until row k of macroblocks is fully processed, in which case processing will continue with macroblock $P_{T-1}(1, k+1)$. As a result, much of the contents of prior frame $P_{T-1}$ will no longer be required for use in the prediction of P frame $P_T$; in particular, all macroblocks $P_{T-1}(x, y)$ where y is less than k−1, and those macroblocks $P_{T-1}(x, y)$ where y=k (i.e., in row k) with x less than j−1, are no longer needed for prediction process 46. These macroblocks are illustrated as hatched in FIG. 9a. According to this embodiment of the invention, these macroblocks will be discarded, or more specifically written-over with new data, as will be described hereinbelow.

FIG. 9b similarly represents the contents of current or future P frame $P_T$ at a corresponding point of generation as in FIG. 9a; according to conventional methods, as discussed above, P frame $P_T$ is stored in main memory 40 in connection with array signal newframe. In this example, macroblock $P_T(j,k)$ has already been predicted, based on the processing of macroblocks $P_{T-1}(j±1, k±1)$ as noted above. However, those macroblocks $P_T(x,y)$ for which y is greater than k, and for which y equals k and x is greater than j, have yet to be predicted. These macroblocks are illustrated as hatched in FIG. 9b.

Referring now to FIG. 9c, the combination of the valid or necessary data in frames $P_{T-1}$ and $P_T$ into a single memory resource with buffer will now be described. According to the preferred embodiment of the invention, it was observed that the data of the predicted macroblocks $P_T(x, y)$ could be written over the data of the prior macroblocks $P_T$ that will no longer be used, so long as provision is made for the temporary storage of those macroblocks $P_T(x,y)$ corresponding to locations for which data of the prior macroblocks $P_{T-1}(x,y)$ are currently needed or will be needed for the prediction of future macroblocks. In particular, it was observed that those trailing macroblocks in the same, kth, row as the current macroblock $P_T(j, k)$ being predicted, and those macroblocks in the previous (k−1) row and with a column position y that is equal to or greater than j−1, must be retained, even though macroblocks $P_T$ have already been generated for these positions.

As illustrated in FIG. 9c, and as will be described in detail hereinbelow, a single memory resource, such as in main memory 40, associated with array signal old/newframe is used according to the present invention, for the storage of both prior frame $P_{T-1}$ macroblocks and current frame $P_T$ macroblocks. In this example, the macroblocks in the kth row and forward, and those macroblocks in row k−1 and column j−1 and greater, contain the data for prior frame $P_{T-1}$, while those macroblocks in row k−2 and less, and those macroblocks in row k−1 and columns j−1 and less, correspond to current frame $P_{T-1}$. Since additional macroblocks $P_T(x, y)$ have been generated, specifically those corresponding to columns j and lower in row k and, and those corresponding to columns j−1 and greater in row k−1, buffer NEWBFR is provided, preferably in on-chip shared memory 33 of main integrated circuit 30, for temporary storage in a FIFO fashion. Upon completion of the prediction of macroblock $P_T(j, k)$ the oldest macroblock in buffer NEWBFR (which will generally be macroblock $P_T(j-1, k-1)$, with addresses wrapping around), may be written over the corresponding macroblock is $P_{T-1}(j-1, k-1)$ in memory resource old/newframe.

Figure 10:
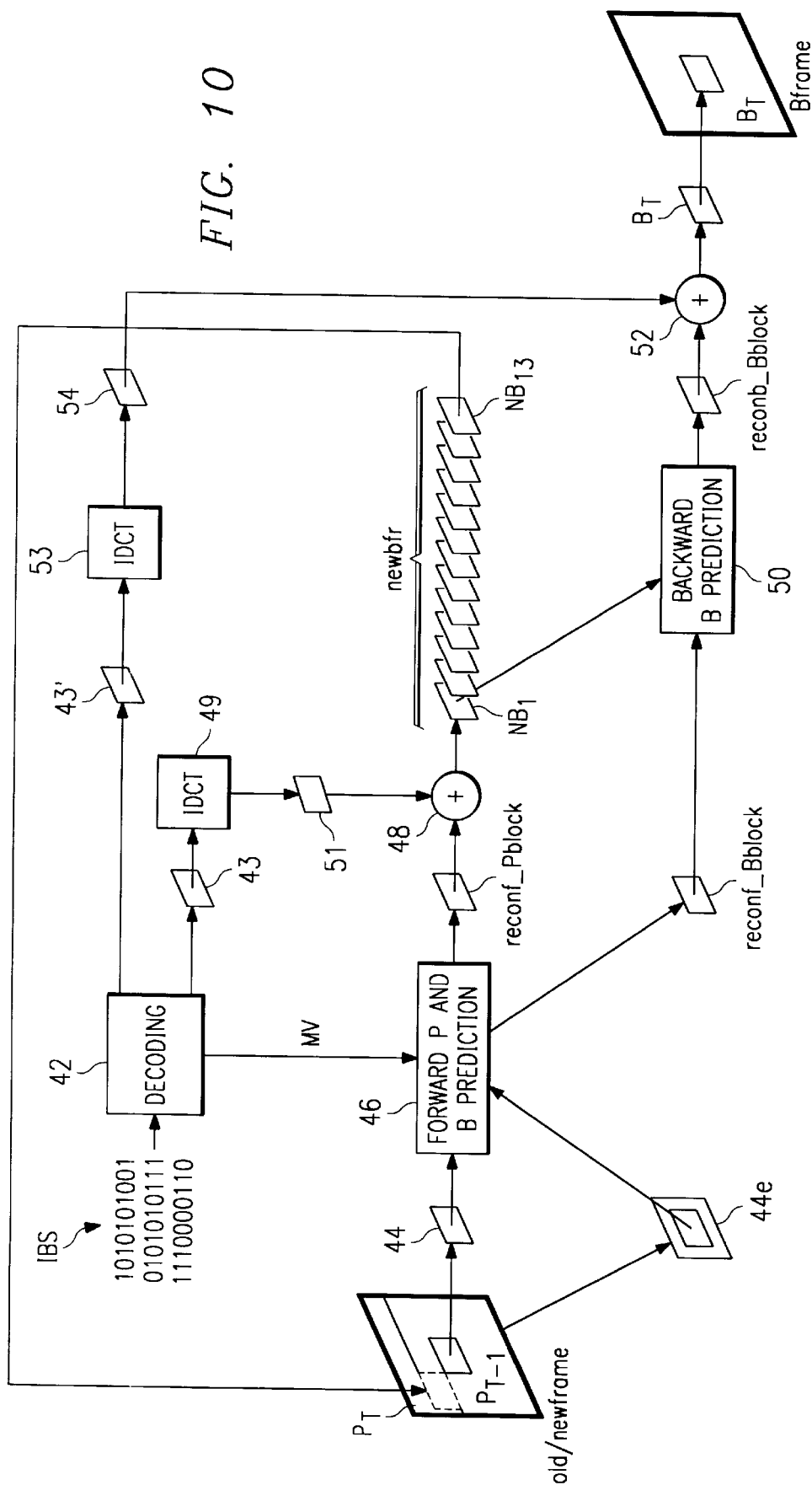
FIG. 10 is a pictorial representation of a video decoding method according to a second preferred embodiment of the present invention.

Referring now to FIG. 10, the operation of video decoder system 20 in carrying out this preferred embodiment of the invention will now be described in detail. Similar processes, buffers, and results as described hereinabove relative to FIG. 5 are shown in FIG. 10 in connection with the same reference numerals and characters, and will not be re-described hereat.

As is evident from FIG. 10, those macroblocks of prior frame $P_{T-1}$ that remain to be utilized are stored in main memory 40 in connection with array signal old/newframe. Macroblock $P_{T-1}(x,y)$ and its neighboring macroblocks in the 3×3 neighborhood are retrieved and stored in buffer 44 (as illustrated in FIG. 7), as before; previously, the edge pixels $P_{edge}$ have been retrieved and stored in edge buffer 44e, as described above, for application to combined forward P and B prediction process 46. These edge pixels $P_{edge}$ are retrieved, of course, from the prior P frame $P_{T-1}$, before rewriting of new frame $P_T$ is initiated. Alternatively, the use of an address filter to translate the addresses may be utilized, as described above.

Decoding and prediction processes 42, 46, and summing process 48, are performed as before, using the information from prior frame $P_{T-1}$ as retrieved from main memory 40 and stored in buffer 44, similarly as illustrated relative to FIG. 8 described hereinabove. As described hereinabove, the repeated reads of prior frame $P_{T-1}$ data are made from lower level memory, namely buffer 44, rather than from main memory 40. As each macroblock $P_T(x, y)$ is generated in summing process 50, however, the macroblock $P_T(X, y)$ is stored in a location of buffer NEWBFR, which is located in on-chip shared memory 33 of main integrated circuit 30. Buffer NEWBFR, in this example, includes thirteen locations $NB_1$ through $NB_{13}$ that are arranged in a first-in-first-out, or circular, manner, with location $NB_{13}$ storing the oldest macroblock data and location $NB_1$ storing the most recent macroblock data.

According to the preferred embodiment of the invention, buffer NEWBFR is operated in response to the generation of a new macroblock $P_T(x, y)$ by first writing the contents of location $NB_{13}$, which contains the oldest macroblock, into main memory 40 in array signal old/newframe. In particular, as described hereinabove relative to FIGS. 9a through 9c, in the event where macroblock $P_T(j, k)$ is generated by summing process 48, the contents of location $NB_{13}$ will be written into macroblock $P_T(j-1, k-1)$, considering the wrap-around of addresses in the frame. The contents of each of the macroblocks in buffer NEWBFR then advance, and the most recently generated macroblock $P_T(x, y)$ is written into location $NB_1$ of buffer NEWBFR. Of course, it is contemplated that the data will generally not physically "advance" from location to location within buffer NEWBFR, but rather one or more pointers will indicate the location $NB_{13}$ from which data is to be read and location $NB_1$ to which data is to be written in carrying out the operation illustrated in FIG. 10. Alternatively, buffer NEWBFR may be arranged as a stack, with data pushed thereonto and popped therefrom, if desired.

Following the storing of the new macroblock $P_T(x, y)$ into location $NB_1$ of buffer NEWBFR, the prediction process will continue from the next macroblock $P_T(x+1, y)$, in the same manner. In addition, since backward B prediction process 50 requires the results of the current predicted macroblock $P_T(x, y)$, process 50 accesses this information from buffer NEWBFR, particularly from location $NB_1$, in its generation of current B frame $B_T$ in the manner described hereinabove.

As a result, according to this second embodiment of the present invention, a single memory resource old/newframe, along with an on-chip buffer NEWBFR, may be used to store both the prior predicted frame $P_{T-1}$ and also the current predicted P frame $P_T$. This combination of prior predicted frame $P_{T-1}$ and current predicted P frame $P_T$ into the same memory resource is contemplated to significantly reduce the chip area required for implementation of the video decoder hardware, without any penalty in power consumption or in execution performance.

According to the preferred embodiments of the invention described hereinabove, therefore, it is contemplated that significant reduction in the power dissipation of the video decoding process may be obtained. While this power reduction may be maximized through the use of each of the techniques described herein in combination, it is contemplated of course that those of ordinary skill in the art may alternatively use subsets of these approaches to great benefit, depending upon the particular system implementation.

It will be understood by those skilled in the art having reference to this specification that various alternatives and variations upon the preferred embodiments of the present invention described herein may be utilized, without departing from the scope of the invention as claimed herein. For example, without limitation thereto, motion compensation modes according to the H.263 standard other than the OBMC compensation described hereinabove may be utilized. These alternative modes are similar to, but simpler than, the OBMC mode described above. It is therefore contemplated that those of ordinary skill in the art, having reference to this specification, will be readily able to implement the algorithm transformations and memory organization solutions described hereinabove for those other modes.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of decoding a received bitstream of compressed video data, comprising the steps of:
   storing a previously predicted video frame in memory;
   decoding motion vector information for a current video frame from the received bitstream; and
   for each of a plurality of macroblocks of the previously predicted video frame:
      determining whether at least one component of a motion vector for the current video frame points out of a displayable image range;
      responsive to the determining step determining that at least one component of a motion vector points out of the displayable image range, translating a pixel address corresponding to the motion vector to an edge pixel address corresponding to a pixel location along an edge of the displayable image range;
      retrieving pixel data corresponding to the modified pixel address; and
      performing motion compensation using the retrieved pixel data upon the macroblock of the previously predicted video frame.

2. The method of claim 1, wherein each macroblock comprises luminance and chrominance transform coefficients for a plurality of pixels of a video image frame.

3. The method of claim 1, further comprising:
   responsive to the determining step determining that no component of a motion vector points out of the displayable image range, accessing pixel data corresponding to the motion vector from memory; and
   performing motion compensation using the retrieved pixel data upon the macroblock of the previously predicted video frame.

4. The method of claim 3, wherein the previously predicted video frame corresponds to a P frame;
   wherein each macroblock comprises luminance and chrominance transform coefficients for a plurality of pixels of a video image frame;
   and further comprising, for each of the plurality of macroblocks of the previously predicted video frame:
      generating inverse transform coefficients from the received bitstream;
      after the step of performing motion compensation, adding the inverse transform coefficients to the macroblock to produce a current P block; and storing the current P block in memory.

5. The method of claim 4, further comprising, for each of the macroblocks of the previously predicted P frame:
performing motion compensation upon the macroblock to generate a forward-predicted B block;
after the step of adding the inverse transform coefficients to the macroblock to produce a current P block, using the forward-predicted B block and the current P block to produce a current B block; and
storing the B block in memory.

6. The method of claim 1, wherein the received bitstream is compressed according to the H.263 standard.

7. A computing system comprising:
circuitry for receiving an input bitstream of compressed video data;
memory circuitry;
a central processing unit, coupled to the receiving circuitry and to the memory circuitry, and programmed to repetitively perform a sequence of operations comprising the steps of:
accessing the memory circuitry to retrieve edge pixels of a previously predicted video frame that is stored in the memory circuitry;
storing pixel data corresponding to the retrieved edge pixels in an edge buffer;
decoding motion vector information for a current video frame from the input bitstream; and
for each of a plurality of macroblocks of the previously predicted video frame, each macroblock comprising luminance and chrominance transform coefficients for a plurality of pixels of a video image frame:
determining whether at least one component of a motion vector for the current video frame points out of a displayable image range;
responsive to the determining step determining that at least one component of a motion vector points out of the displayable image range, modifying the at least one component of the motion vector to an edge of the displayable range to derive a modified motion vector;
accessing the edge buffer to retrieve pixel data corresponding to an edge pixel indicated by the modified motion vector;
performing motion compensation using the retrieved pixel data upon the macroblock of the previously predicted video frame;
generating a current predicted video frame, using the results of the step of performing motion compensation; and
storing the current predicted video frame in the memory circuitry, for use as a previously predicted video frame in a subsequent repetition of the sequence of operations.

8. The computing system of claim 7, further comprising:
input/output circuitry, coupled to the central processing unit; and
a video display, coupled to the input/output circuitry, for displaying video images generated by the central processing unit from a sequence of predicted video frames.

9. The computing system of claim 7, further comprising:
a battery, for powering the central processing unit and the memory circuitry.

10. The computing system of claim 7, wherein the edge buffer is implemented on the same integrated circuit as the central processing unit;
and wherein the memory circuitry comprises:
main memory, implemented on a different integrated circuit from the central processing unit, for storing the previously predicted video frame and the current predicted video frame.

11. The computing system of claim 7, wherein the programmed sequence of operations further comprises:
responsive to the determining step determining that no component of a motion vector points out of the displayable image range, accessing pixel data corresponding to the motion vector from the memory circuitry; and
performing motion compensation using the retrieved pixel data upon the macroblock of the previously predicted video frame.

12. The computing system of claim 11, wherein the previously predicted video frame corresponds to a P frame;
and wherein the programmed sequence of operations further comprises, for each of the plurality of macroblocks of the previously predicted video frame:
generating inverse transform coefficients from the input bitstream;
after the step of performing motion compensation, adding the inverse transform coefficients to the macroblock to produce a current P block; and
storing the current P block in the memory circuitry.

13. The computing system of claim 12, wherein the programmed sequence of operations further comprises, for each of the macroblocks of the previously predicted P frame:
performing motion compensation upon the macroblock to generate a forward-predicted B block;
after the step of adding the inverse transform coefficients to the macroblock to produce a current P block, using the forward-predicted B block and the current P block to produce a current B block; and
storing the B block in the memory circuitry.

14. The computing system of claim 7, wherein the input bitstream is compressed according to the H.263 standard.

15. A computing system comprising:
circuitry for receiving an input bitstream of compressed video data;
a main memory;
a main integrated circuit, comprising:
input/output circuitry, coupled to the receiving circuitry;
a new block buffer, for storing a plurality of video image blocks in a sequence from a newest block to an oldest block;
a memory controller, coupled to the main memory; and
a central processing unit, coupled to the input/output circuitry, to the new block buffer, and to the memory controller, and programmed to repetitively perform a sequence of operations comprising the steps of
retrieving, from main memory, at least one block of previously predicted video image data corresponding to a first location within a video frame;
decoding the input bitstream to derive motion vector information;
combining the retrieved at least one block of video image data with the motion vector information to produce a current predicted block of video image data corresponding to a second location within the video frame;
storing the current predicted block corresponding to the second location in the new block buffer as the newest block; and storing the oldest block of the new block buffer into main memory at a location corresponding to the first location within the video frame.

16. The computing system of claim 15, wherein each video frame is arranged as a plurality of blocks in a sequence of rows and columns;

wherein the step of retrieving at least one block of previously predicted video image data retrieves a block of previously predicted video image data corresponding to the second location within the video frame, and blocks in adjacent locations to the second location including the first location, the first location being in a previous row and previous column to that of the second location in the sequence of rows and columns.

17. The computing system of claim 15, wherein the programmed sequence of operations further comprises:

decoding the input bitstream to derive inverse transform coefficients;

and wherein the combining step comprises:

performing a forward P prediction from the at least one block of video image data and motion vector information; and adding the inverse transform coefficients to the results of the step of performing the forward P prediction.

18. The computing system of claim 17, wherein the programmed sequence of operations further comprises:

performing a forward B prediction from the at least one block of video image data and motion vector information to produce a reconfigured B block of video image data;

after the combining step, performing a backward B prediction from the reconfigured B block of video image data and the current predicted block of video image data corresponding to a second location;

then combining the results of the backward B prediction step with inverse transform coefficients to produce a current B block of video image data; and storing the current B block of video image data in main memory.

19. The computing system of claim 15, further comprising:

a video display, coupled to the input/output circuitry, for displaying video images generated by the central processing unit from a sequence of predicted video frames.

20. The computing system of claim 19, further comprising:

a battery, for powering the main integrated circuit and the main memory.

21. The computing system of claim 15, wherein the input bitstream is compressed according to the H.263 standard.

22. A computing system, comprising:

circuitry for receiving an input bitstream of compressed video data;

a main memory;

a main integrated circuit, comprising:

input/output circuitry, coupled to the receiving circuitry;

at least one buffer;

a memory controller, coupled to the main memory; and a central processing unit, coupled to the input/output circuitry and to the memory controller, and programmed to repetitively perform a sequence of operations comprising the steps of:

retrieving, from main memory, at least one block of previously predicted P frame image data;

storing the retrieved at least one block of previously predicted P frame image data in the buffer of the main integrated circuit;

decoding the input bitstream to derive motion vector information and inverse transform coefficients;

performing a combined forward P prediction and forward B prediction upon the stored retrieved at least one block of previously predicted P frame image data, using the motion vector information, to produce an intermediate current P block and a first intermediate B block;

combining the intermediate current P block with inverse transform coefficients to produce a new current P block; and storing the new current P block in main memory as a portion of a current predicted P frame.

23. The computing system of claim 22, further comprising:

a video display, coupled to the input/output circuitry, for displaying a sequence of video images corresponding to the current predicted P frame and the current predicted B frame.

24. The computing system of claim 22, wherein the programmed sequence of operations further comprises the steps of:

performing backward B prediction using the first intermediate B block and the new current P block to produce a second intermediate B block;

combining the second intermediate B block with inverse transform coefficients to produce a current B block; and then storing the current B block in main memory as a portion of a current predicted B frame.

25. The computing system of claim 24, wherein the programmed sequence of operations further comprises the steps of:

after the step of combining the intermediate current P block with inverse transform coefficients to produce a new current P block, storing the new current P block in a buffer of the main integrated circuit;

wherein the step of performing backward B prediction retrieves the new current P block from the buffer;

and wherein the step of storing the new current P block in main memory as a portion of a current predicted P frame is performed after the step of performing backward B prediction.

26. The computing system of claim 22, further comprising:

a battery, for powering the main integrated circuit and the main memory.

27. A computing system comprising:

circuitry for receiving an input bitstream of compressed video data;

memory circuitry;

a buffer memory;

a central processing unit, coupled to the receiving circuitry and to the memory circuitry, and programmed to repetitively perform a sequence of operations comprising the steps of:

accessing the memory circuitry to retrieve a first macroblock of a previously predicted video frame, and to retrieve a plurality of neighboring macroblocks to the first macroblock of the previously predicted video frame, each macroblock comprising luminance and chrominance transform coefficients for a plurality of pixels;

storing pixel data corresponding to the retrieved first macroblock and the plurality of neighboring macroblocks in a first location of the buffer memory;

performing a prediction upon the stored retrieved first macroblock to produce an intermediate current predicted block;

storing the intermediate current predicted block in a second location of the buffer memory;

repeating the retrieving, storing, performing, and storing operations for each of a plurality of macroblocks of the previously predicted video frame to generate a current predicted video frame; and then storing the current predicted video frame in the memory circuitry.

28. The computer system of claim 27, wherein the plurality of macroblocks correspond to an array of macroblocks arranged in rows and columns;

and wherein the plurality of neighboring macroblocks correspond to macroblocks that are both in a neighboring row and a neighboring column to the row and column of the first macroblock.

29. The computer system of claim 27, wherein the programmed sequence of operations further comprises:

decoding the input bitstream to derive motion vector information;

and wherein the predicting operation comprises:

combining pixel data from the retrieved first macroblock and neighboring macroblocks with the motion vector information to produce a current predicted macroblock; and storing the current predicted macroblock in the second location of the buffer memory.

30. The computing system of claim 29, wherein the programmed sequence of operations further comprises:

decoding the input bitstream to derive inverse transform coefficients;

and wherein the predicting operation further comprises:

retrieving a predicted macroblock from the second location of the buffer memory;

then adding the inverse transform coefficients to the retrieved predicted macroblock; and then storing the results of the adding step in the buffer memory at a third location.

31. The computing system of claim 27, wherein the previously predicted video frame corresponds to a P frame;

wherein the operation of performing a prediction comprises:

decoding the input bitstream to derive motion vector information and inverse transform coefficients; and performing a combined forward P prediction and forward B prediction upon the stored retrieved macroblocks, using the motion vector information, to produce the intermediate current predicted block, which corresponds to an intermediate current P block, and to also produce a first intermediate B block;

and wherein the programmed sequence of operations further comprises:

combining the intermediate current predicted block with inverse transform coefficients to produce a new current P block; and then storing the new current P block in the buffer memory at a third location.

32. The computing system of claim 31, wherein the operation of performing a prediction further comprises:

storing the intermediate current predicted block in a second location of the buffer memory;

and wherein the programmed sequence of operations further comprises:

retrieving the intermediate current predicted block from the second location of the buffer memory, before the combining step.

33. The computing system of claim 32, wherein the operation of performing a prediction further comprises:

performing a backward B prediction upon the first intermediate B block, using the new current P block retrieved from the buffer memory, to produce a second intermediate B block; and combining the second intermediate B block with inverse transform coefficients to produce a new current B block.

34. The computing system of claim 27, further comprising:

a video display, coupled to the central processing unit, for displaying video images generated by the central processing unit from a sequence of predicted video frames.

35. The computing system of claim 27, further comprising:

a battery, for powering the central processing unit, the buffer memory, and the memory circuitry.

36. The computing system of claim 27, wherein the input bitstream is compressed according to the H.263 standard.

* * * * *